(12) United States Patent
Vermes et al.

(10) Patent No.: US 6,298,654 B1
(45) Date of Patent: Oct. 9, 2001

(54) AMBIENT PRESSURE GAS TURBINE SYSTEM

(76) Inventors: Géza Vermes, 1460 Elm St., Apt. 421B, Stratford, CT (US) 06615; János M. Beér, 6 Country La., Winchester, MA (US) 01890

( * ) Notice: Subject to any disclaimer, the term of this patent is extended or adjusted under 35 U.S.C. 154(b) by 0 days.

(21) Appl. No.: 09/655,257

(22) Filed: Sep. 5, 2000

Related U.S. Application Data

(60) Provisional application No. 60/152,823, filed on Sep. 7, 1999.

(51) Int. Cl.[7] ........................................... F02C 7/00
(52) U.S. Cl. ............................... 60/39.02; 60/39.41
(58) Field of Search ............................. 60/39.41, 39.02

(56) References Cited

U.S. PATENT DOCUMENTS

| | | | |
|---|---|---|---|
| 2,131,031 | 9/1938 | Avery | 75/41 |
| 2,541,532 | 2/1951 | Mosser | 60/41 |
| 3,369,361 | 2/1968 | Craig | 60/39.5 |
| 3,449,548 | 6/1969 | Adamek et al. | 219/216 |
| 4,154,055 | 5/1979 | Pulick et al. | 60/39.5 |
| 4,845,940 | 7/1989 | Beér | 60/732 |
| 5,148,670 | 9/1992 | Birch et al. | 60/39.142 |
| 5,645,410 | 7/1997 | Brostmeyer | 431/10 |
| 5,836,164 | 11/1998 | Tsukahara et al. | 60/733 |

OTHER PUBLICATIONS

David Gordon Wilson, *The Design of High Efficiency Turbomachinery and Gas Turbines*, Chapter 3: Gas–Turbine Power Cycles, Section 3.10: "The inverted Brayton cycle", MIT Press 1984, pp. 135–139.

*Primary Examiner*—Timothy S. Thorpe
*Assistant Examiner*—Ehud Gartenberg
(74) *Attorney, Agent, or Firm*—Weingarten, Schurgin, Gagnebin & Hayes LLP

(57) ABSTRACT

An ambient pressure gas turbine system is provided for mid-range power plants (for example, 1–4 MW) while achieving low $NO_x$ emission levels. The system includes a combustor that burns a hydrocarbon fuel at ambient pressure. A first heat exchanger upstream of the combustor heats the working fluid. A turbine downstream from the combustor expands combustion gases. The combustion gases are directed to the first heat exchanger for heat exchange with the working fluid and then to a compressor operative to compress the combustion gases. A second heat exchanger between the first heat exchanger and the compressor further cools the combustion gases to the compressor inlet temperature.

13 Claims, 3 Drawing Sheets

AMBIENT PRESSURE GAS TURBINE SYSTEM

CROSS REFERENCE TO RELATED APPLICATIONS

Applicant claims priority under 35 U.S.C. §119(e) to U.S. provisional application No. 60/152,823 filed Sep. 7, 1999, the disclosure of which is incorporated herein by reference.

STATEMENT REGARDING FEDERALLY SPONSORED RESEARCH OR DEVELOPMENT

N/A

BACKGROUND OF THE INVENTION

The trend in power generation gas turbine technology for several decades has been to build turbines of increasing size. The application of these large units in combined cycles lead to 500 MW plants (60 Hz) of two 130 MW gas turbines plus a condensing steam turbine with the associated heat recovery steam generators. The permitting and erection time of these plants is much shorter than those of the usual 2×1000 MW coal fired steam plants (let alone the time required to build a nuclear plant). Nevertheless, with respect to gas turbine unit size, governmental action and economic conditions have created a new situation during the last few years. Under the federal PURPA Law, producers of electricity may sell power back to the utility network when a local surplus of power occurs. This possibility, in principle, extends down to unit sizes characteristic of the needs of individual households (15 kW or less), but these units will be disregarded as subjects of the present invention, for two reasons. First, producing such small units economically in large quantities would necessitate large investments into the setting up of large production facilities similar to automobile engines, which is an industry different from the present gas turbine industry. Second, one of the main advantages of the present invention is extremely low $NO_x$ emission, but there are no $NO_x$ regulations for such small units. This situation removes the main incentive to apply the present invention to household units. Therefore, the present invention is focused on the mid-sized units in the 1–4 MW range. Such units would be of interest to hospitals, shopping centers, military bases, etc., where heat and electricity can be economically generated in "retail" quantities by the consumer itself, the heat energy being a low cost by-product of power generation. Using the backsale provision of PURPA, the small energy producer can pick the most economical combination of heat and power generation, in accordance with his own changing requirements.

In addition to the opportunities created by the backsale provision of the PURPA law, the ongoing deregulation of electric energy prices is expected to create even greater opportunities for small generating units due to the influence of competition in an emerging free market.

SUMMARY OF THE INVENTION

Under the above-described conditions, a competitive, middle range (1–4 MW) gas turbine system is provided that addresses several characteristics. The system achieves low emissions, especially of $NO_x$, due to the residential environment. $NO_x$ reductions in the single digits are possible with an appropriate combustor or burner. The system is also highly efficient to be price competitive with the network. The system may also be used with the least expensive fuel, namely coal. Also, the system may reduce or eliminate the most influential contributor to global warming, the emission of $CO_2$.

In particular, the system provides an ambient pressure gas-turbine (APG). The system includes a combustor that burns a gaseous, liquid, or solid fuel in air or another working fluid at ambient pressure. A first heat exchanger upstream of the combustor heats the working fluid to the combustor inlet temperature. A turbine downstream from the combustor expands the combustion gases from the combustor. The combustion gases are directed to the first heat exchanger for heat exchange with the working fluid and then to a compressor operative to compress the combustion gases. A second heat exchanger between the first heat exchanger and the compressor further cools the combustion gases to the compressor inlet temperature.

DESCRIPTION OF THE DRAWINGS

The invention will be more fully understood from the following detailed description taken in conjunction with the accompanying drawings, in which.

DETAILED DESCRIPTION OF THE INVENTION

Figures 1, 2:
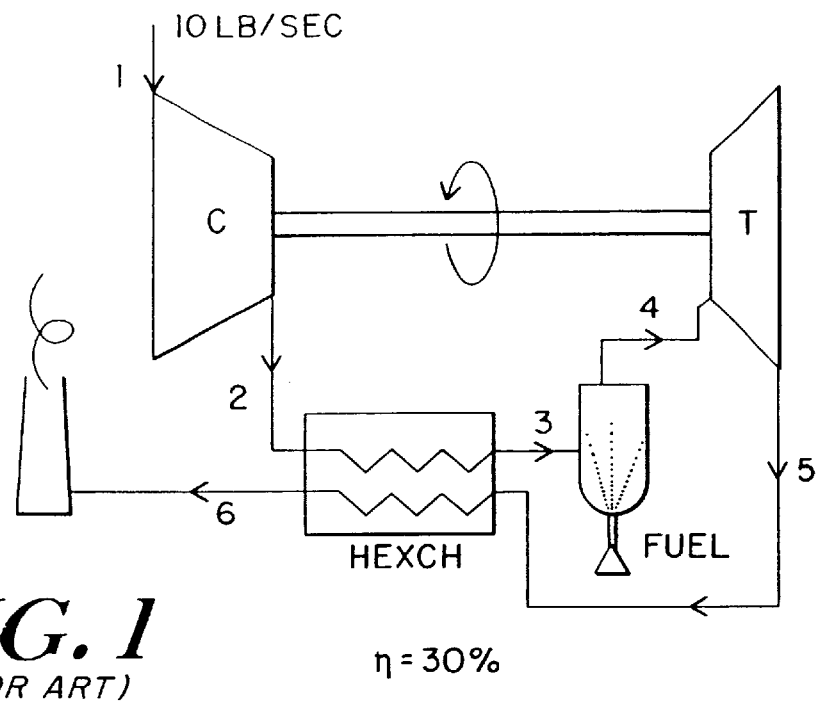
FIG. 1 illustrates a prior art regenerative gas turbine cycle.
FIG. 2 illustrates the ambient pressure gas turbine combustor system of the present invention.

A first embodiment of an ambient pressure gas-turbine combustor (APG) system according to the present invention is shown in FIG. 2. A working fluid enters a first heat exchanger 12 (HEX 1) at approximately ambient, atmospheric pressure (station 1) at a rate of, for example, 8.2 lb/sec. The working fluid is generally air, although pure oxygen or oxygen enriched air may be used, as described further below. The first heat exchanger 12 heats the air to approximately 660° F. The air then enters a combustor 14 (station 2). Fuel from a fuel source 16 is supplied to the combustor 14 through, for example, a suitable fuel injector. The hot combustion products from the combustor 14 are directed to a turbine 18 at approximately atmospheric pressure (station 3). Upon exiting the turbine, the pressure has been substantially reduced to below atmospheric pressure. The hot combustion products are directed to the first heat exchanger 12 for heating the incoming working fluid (station 4).

The combustion products are also directed to a second heat exchanger 20 (station 5) to extract further heat to cool the gas to a desired compressor inlet temperature before being directed to a compressor 22 (station 6) on a common shaft with the turbine 18. Because of thermodynamic reasons (cycle efficiency), the compressor inlet temperature must be kept as low as possible, such as 159° F. The extracted heat, however, cannot be completely utilized in preheating the combustion air in the first heat exchanger 12 (HEX 1) because the combustor inlet temperature has to be kept at the conventional 660° F. (otherwise the $NO_x$ would rapidly increase). Therefore, the second heat exchanger 20 (HEX 2) is provided. The exhaust from the second heat exchanger may be mixed with the compressor exhaust and utilized elsewhere in the plant (not shown), or HEX 2 may be a steam generator, feed water heater, space air heater, etc., depending on the local conditions. The compressor exhaust may also be directed to an exhaust stack 24.

As an example for a 1.1 MW turbine, the temperature and pressure at the various stations are as follows:

| Station | Pressure psia | Temperature °F. |
|---|---|---|
| 1 | 14.7 | 59 |
| 2 | 14.3 | 660 |
| 3 | 13.8 | 2200 |
| 4 | 1.3 | 1034 |
| 5 | 1.2 | 440 |
| 6 | 1.2 | 159 |
| 7 | 14.7 | 860 |

For comparison, a conventional, regenerative cycle is also shown in FIG. 1. The example is based on a 1.1 MW (electrical) turbine, such as that described in "TG 15 Alternative Fuels Combustor Development," G. Vermes, Textron-Lycoming Report MO 071390GV1, Jul. 17, 1990. In the conventional cycle, the working fluid is compressed in the compressor, thereby raising its pressure to the operating pressure of the combustor, for example, 12 atm in the 1.1 MW turbine example. As an example for a prior art 1.1 MW turbine, the temperature and pressure at the various states are as follows:

| Station | Pressure psia | Temperature °F. |
|---|---|---|
| 1 | 14.7 | 59 |
| 2 | 20.0 | 750 |
| 3 | 19.5 | 930 |
| 4 | 19.0 | 2080 |
| 5 | 16.0 | 1050 |
| 6 | 14.7 | 900 |

As is apparent by reference to the above discussion and FIG. 2, the usual sequence of the machinery components of the gas turbine cycle is altered to accommodate the ambient pressure combustor in the present invention. Referring FIG. 2, the working fluid enters the expander first (station 3) and the compressor second (station 6). In this way, the combustion process takes place at approximately ambient pressure as opposed to the conventional gas turbine (see FIG. 1), where the combustor operates at 12 atm (in the example chosen). Other combustor parameters being equal, the reduced pressure results in an approximately $(12)^{1/2}=3.46$ times reduction of the thermal $NO_x$ output of the gas turbine.

A low-$NO_x$ burner that is suitable for use in the cycle of the present invention is, for example, the Multi-Annular Swirl Burner (MASB) that has been described in "Low $NO_x$ and Fuel Flexible Gas Turbine Combustors," H. G. Lew et al., *Journal of Eng. for Power*, vol. 104, April 1982. See also U.S. Pat. No. 4,845,940. This burner produced 80–90 ppm $NO_x$ on diesel fuel (DF-2) under APG conditions except for the pressure. Using natural gas as the fuel and at 1 atm pressure, this $NO_x$ level would be:

$$0.55(3.46)^{-1}85=13.5 \text{ ppm(v)},$$

thus satisfying the low $NO_x$ criterion. As discussed further below, this burner may also be modified to achieve single digit $NO_x$ levels.

The small size of the 1 MW machine would result in blade paths of small dimensions for a conventional turbine. Such small dimensions have a deleterious effect on component efficiency. The conventional cycle used as a basis for comparison has only 84% polytropic (stage) compression efficiency (on average; the last stage must be made centrifugal), resulting in 78% adiabatic efficiency for the compression stage. The turbine (expander) overall efficiency is 87%. In the APG of the present invention, the 10–12 times larger specific volume results in dimensions that are approximately three times larger. This larger machinery size makes it possible to count on better adiabatic efficiency; 94% and 89% were assumed for the turbine (expander) and the compressor, respectively.

The low pressure level of the APG also has an important consequence on the mechanical design of the component machinery. Casings of conventional turbines and compressors have to be designed to withstand a 10–12 atm pressure differential, whereas the APG machinery is designed for a 1 atm pressure differential. Considering that failure in the conventional machine results in an explosion whereas failure in the APG machinery causes an implosion, the reduced pressure and the reduced risk in the APG should result in physically larger but less material-sensitive design.

An important additional inherent advantage of the APG relates to blade cooling. In the conventional turbine, the cooling air is available at the compressor exit temperature (in the cited example, this is 670° F). The amount of cooling air depends on the temperature difference between the desired metal temperature, about 1500° F. and the 670° F. air temperature i.e., 830° F. In the APG turbine, the cooling air is at 60° F., resulting in 1500° F.−60° F.=1440° F. temperature difference, thereby reducing significantly the necessary cooling air flow.

It should be pointed out, to the best of the inventors' knowledge, a 13 ppm $NO_x$ level could be achieved so far only with combustors that have unconventional features, such as careful premix, catalytic surfaces, complicated controls, etc. For a small, unattended turbine in a prior art cycle, these features present much greater disadvantages than for large plants. In contrast, the Multi-Annular Swirl Burner (MASB) has none of these drawbacks. Rather, control of the turbine is completely conventional; the diffusion flame and the aerodynamic features of the MASB have been shown to provide excellent stability and an unusually large turn-down ratio; and the availability of practically 100% of the airflow for wall cooling purposes provides for a simple wall structure resulting in low manufacturing costs, etc.

In a further embodiment of the invention, a combustor is provided capable of achieving single-digit $NO_x$ levels. The recent (second half of the 1990s) regulatory trend indicates that so-called "single digit" $NO_x$ ($\leq 9$ ppm(v)) will become a necessity for small (<10 MW) gas turbines used for the generation of electricity in residential areas. Prior art gas turbines available on the market offer $NO_x$ levels of 15–20 ppm, using premixed gas and air, or catalytic burners. Both types of burners have difficulties of operation (e.g. turn-down, necessity of pilot burner, danger of flash-back). To restrict the $NO_x$ reliably to the single digit level, exhaust cleanup systems are applied which use ammonia to break up the $NO_x$, resulting in additional costs of operation (besides other drawbacks). If the MASB could be improved to have a $NO_x$ level of 9 ppm(v) instead of 13 ppm(v), all the above cited difficulties could be avoided.

Figure 3:
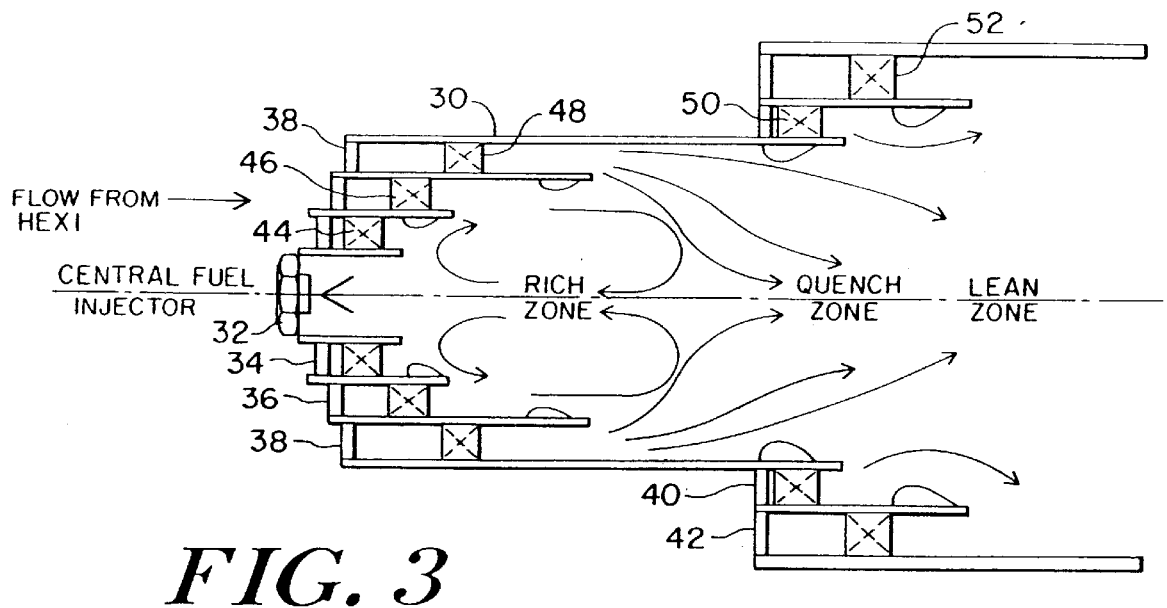
FIG. 3 illustrates a multiannular swirl burner for liquid fuels for use with the system of the present invention.

The multi-annular swirl burner 30 (MASB) mentioned above is shown in FIG. 3. The figure shows a version with a rich-quench-lean design and a central fuel injector 32 surrounded by annuli through which the working fluid enters. In this design, air flow from the first two annuli 34, 36 establishes a fuel rich zone. Air flow from the third annulus 38 quenches the high temperature combustion gases of the first two annuli. The unburned fuel completes the combustion with the air of the fourth and fifth annuli 40, 42 in a fuel lean zone, i.e., relatively low flame temperature reaction mode. Theoretically, such an arrangement should result in single digit $NO_x$ (using oil fuel) from the first two annuli, no $NO_x$ from the third annulus and negligible $NO_x$ from the fourth annulus. Thus, the 80–90 ppm(v) $NO_x$ achieved using diesel fuel, mentioned above, though only about 50% of the $NO_x$ level from a conventional turbine burner, was much higher than could have been expected.

Analysis of the quoted test results concluded that the rich and the lean burner sections performed as expected: the excess $NO_x$ came from the quench section. While the quench flow from the third annulus started to reduce the temperature of the exhaust from the rich section, combustion reactions were triggered by the quench air at stoichiometric temperatures. By the time the mixing process in the quench section established the low temperature lean region necessary to conclude the combustion reactions, there was a 75–80 ppm(v) $NO_x$ created during the quench process. It follows that increasing the efficiency of the mixing process in the quench section will reduce the $NO_x$ production there, though it may not eliminate it completely.

Projecting the above conclusions (obtained from the analysis of the oil burning MASB results) to the proposed 13.5 ppm(v) $NO_x$ atmospheric gas burner case, i.e., reduction of the quench $NO_x$ by, say, one-third, the APG turbine system with the improved MASB would obtain single-digital $NO_x$.

During the research program mentioned here, an experimental rich-quench-lean burner was also investigated (not a MASB) where the three sections had independent air supplies. This burner had similar $NO_x$ level as the MASB (about 70 ppm(v)). It could be shown experimentally that by changing the quench airflow, reduced residence time in the quench section (i.e., reduced time available for combustion reactions to start there) indeed reduced the $NO_x$ emission from the burner. It follows that similar results can be expected from the rich-quench-lean MASB by improving the mixing process in the third annulus.

The aerodynamic design of the MASB discussed here is such that the subsequent annuli (starting from the inside) have decreasing amounts of swirl, set by vanes 44, 46, 48, 50, 52 in the annuli. The innermost annulus has 60° vanes; the outermost annulus has 20° vanes. All the annuli swirl in the same direction, for example, clockwise. This arrangement provided a so-called "free vortex" arrangement, resulting in a minimum amount of pressure drop across the burner: about 1–2% of the total pressure in the combustion chamber. As the combustor pressure drop in a conventional, diffusion flame gas turbine burner is on the order of 3.5%, a MASB in an APG gas turbine system can afford an additional 1–2% pressure drop without hurting the cycle efficiency, if the increased pressure drop can be put to good use.

In the present invention, it is proposed that the MASB be modified such that the third annulus 38 should have its swirl in an opposite sense to the second and the fourth annulus, for example, counterclockwise. This arrangement would do away with the "free vortex" concept, resulting in a higher pressure drop. A single digit $NO_x$ level would, however, be an adequate compensation.

Figure 4:
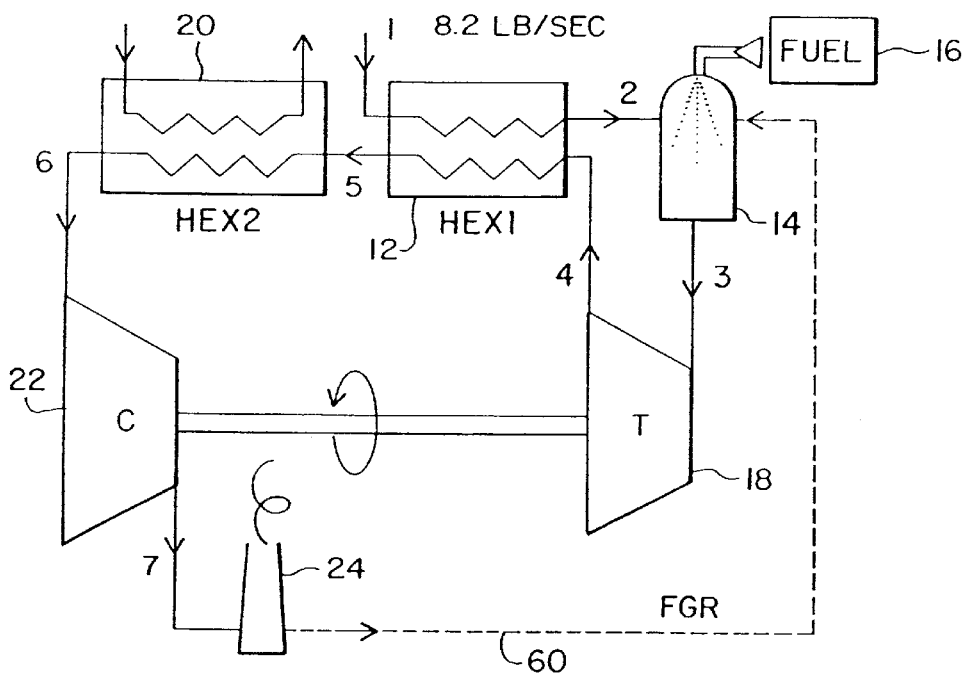
FIG. 4 illustrates the ambient pressure gas turbine combustor system of the present invention incorporating flue gas recirculation.
Figure 5:
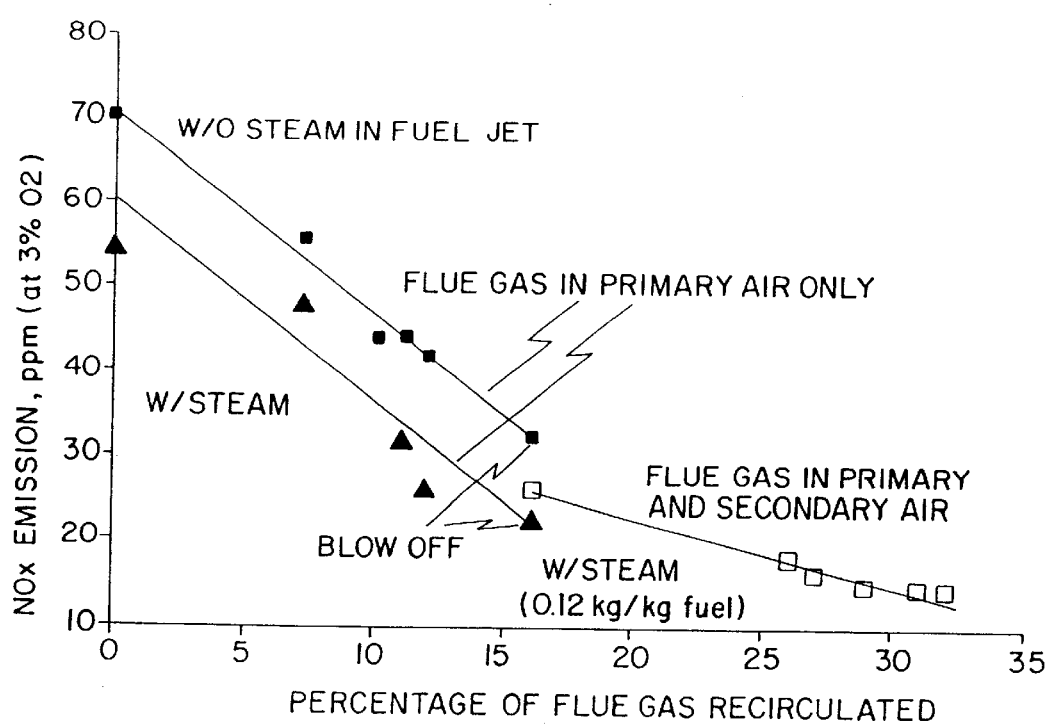
FIG. 5 is a graph of $NO_x$ emissions vs. percentage of flue gas recirculated, illustrating the effect of burner flue gas recirculation and steam injection on $NO_x$ emission (steam/fuel ratio=0.12 kg/kg, $O_2$ at exit=3%)
Figure 6:
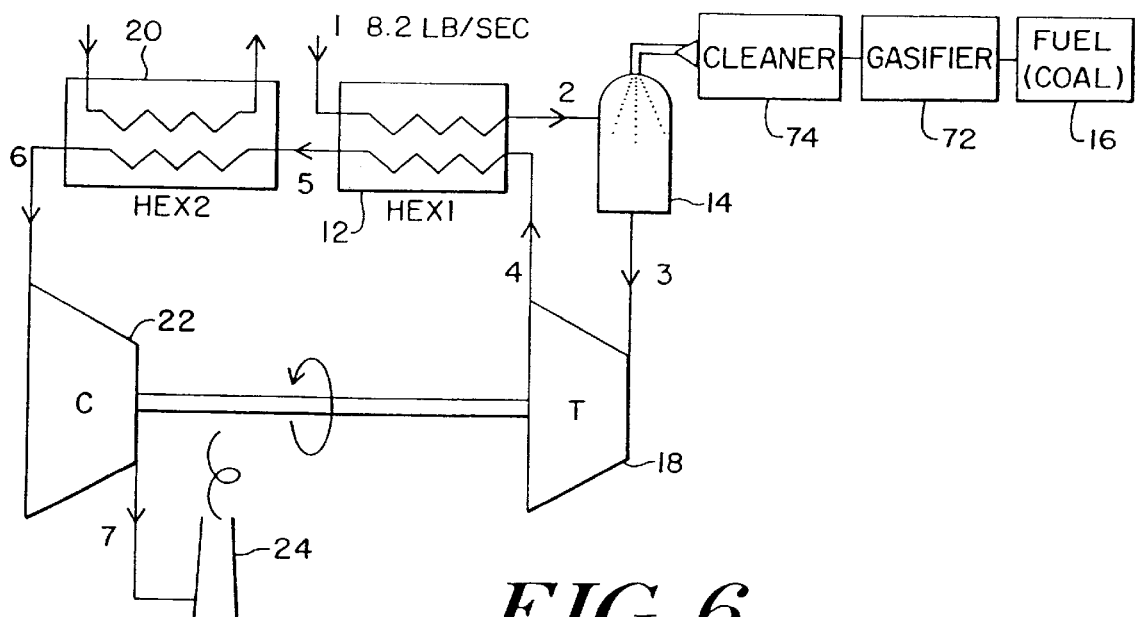
FIG. 6 illustrated the ambient pressure gas turbine combustor system of the present invention incorporating a coal gas fuel source.

A still further embodiment of the invention incorporates flue gas recirculation to further reduce $NO_x$ levels, illustrated in FIG. 4. Flue gas recirculation through piping 60 from the compressor outlet to the combustor is possible because the combustor operates at near atmospheric pressure. The parameters of the flue gas recirculated from the exhaust of the compressor are 860° F. and 14.7 psi with an approximate $O_2$ concentration of 16%. By admixing a fraction of the flue gas with the combustion air, the oxygen concentration of the latter becomes depleted, which is instrumental in reducing further the $NO_x$ formed during combustion. The effect of flue gas recirculation upon $NO_x$ emission from an atmospheric pressure burner of natural gas and air is shown in FIG. 5. (See "Low $NO_x$ Emission from Radially Stratified Natural Gas-Air Turbulent Diffusion Flames," M. A. Toqan et al., $24^{th}$ Symposium (International) on Combustion, The Combustion Institute, Pittsburgh, Pa., 1992.) The fraction of the flue gas recirculated is limited by flame stability considerations but is in the range of 30%.

Due to the slightly higher pressure of the flue gas compared to that of the preheated air entering the combustor the two fluids can be conveniently mixed through the entrainment of the air by flue gas jet(s). Alternatively, the MASB design permits the admission of the recirculated flue gas through one of the annuli at some radial distance from the fuel jet to reduce any detrimental effect on flame stability.

The combination of flue gas recirculation (FGR) with the enrichment of the oxygen content in the $O_2/N_2/CO_2$ oxidizing mixture or even using an $O_2/CO_2$ oxidizer, opens new vistas to the APG. In addition to the enhanced cycle efficiency and extremely low $NO_x$ level explained above, the enrichment of the $O_2$ content has the side effect of an increased $CO_2$ concentration in the exhaust. It was recently shown that increased $CO_2$ content improves the economics of $CO_2$ sequestration, which, in turn, mitigates global warming. See "Enriched Oxygen Fired Combustion," Kelly V. Thambimuthu and Eric Croiset, Report, Natural Resources Canada, 1 Haanel Dr., Nepean, Ontario K1A 1M1, Canada.

As further explanation, the rich-quench-lean sequencing of the combustion process is a known method to reduce $NO_x$ emission from combustion turbines. This method is based on the notion that in high temperature, fuel-rich combustion, all nitrogen compounds, $NO_x$, $N_2O$, cyanogens, amines, and heterocyclic nitrogen compounds, may be converted to molecular nitrogen, $N_2$. $N_2$ is innocuous for $NO_x$ formation. Following the fuel-rich zone, however, more oxidant (air) has to be injected to bring the combustion process to completion and also to reduce the temperature of the combustion products to a level acceptable to the structural elements of the gas turbine, say 1623 K. The quench stage serves for the fast reduction of the gas temperature to below, say 1800 K, reducing thereby $NO_x$ formation rates to a negligible level. In this combustion stage, there is a race between the rapid cooling of the products of the fuel rich stage, and the reaction between molecular nitrogen and atomic oxygen to form $NO_x$. In the conventional case, the quenching medium is air and the high $O_2$ concentration in the air makes it more difficult to avoid the formation of $NO_x$ during the quench process. Because of the availability of $O_2$ deficient flue gas, however, the above-mentioned race can be tilted in favor of the cooling by using recirculated flue gas as the quenching medium. The fast admixing of the relatively cold, say 673 K, flue gas will result in the rapid cooling of the combustion products by dilution, while $NO_x$ formation is suppressed owing to the $O_2$ deficiency. Completion of the combustion process is then achieved by the injection of more air downstream of the quench stage. In this, the lean stage, the fuel burnout is increased to above 99.9% at temperatures and $O_2$ concentrations close to the values at the combustor exit.

An additional perspective of the combination of the APG and the use of oxygen relates to coal as a gas turbine fuel. When using so called "clean fuels" (natural gas, No. 2 distillate), no flue gas cleanup is envisaged. For coal, however, hot gas cleanup is necessary before the combustion products enter the blade path of the expander. In this case, the coal undergoes gasification in an $O_2$ blown gasifier 72, followed by cleaning of the product gas in a cleaner 74. The syngas so produced is then burned with more of the $O_2/CO_2$ mixture in the combustor. Temperature control of the combustor would be as before, by flue gas recirculation.

The arrangement of the turbine components of the present invention thus makes possible flue gas recirculation at ambient pressure. Flue gas recirculation makes application of the system to a low emission gas turbine cycle favorable for $CO_2$ sequestration.

Cleaning of the hot gases has to be very thorough due to the sensitivity of the aerodynamic surfaces of the turbine blades to the erosive effect of solid particles at the high velocities prevailing in the blade passages. In fact, repeated attempts to introduce into industrial practice the direct coal fired gas turbine proved unsuccessful during the last fifty years, due to the lack of acceptable and affordable cleaning equipment at high temperature and high pressure. Transferring the cleaning process from high pressure to ambient, as in the present invention, may make the existing cleaning technology practical.

The invention is not to be limited by what has been particularly shown and described, except as indicated by the appended claims.

What is claimed is:

1. An ambient pressure gas turbine system comprising:
   a combustor operative to burn a gaseous, liquid, or solid fuel in the presence of a working fluid at ambient pressure;
   a turbine downstream from the combustor operative to expand combustion gases from the combustor;
   a compressor downstream from the turbine operative to compress the combustion gases from the turbine;
   a first heat exchanger operative to heat the working fluid on an inlet flow path to a combustor inlet temperature at ambient pressure by heat exchange with the combustion gases on a counterflowing path from the turbine; and
   a second heat exchanger between the first heat exchanger and the compressor to receive the combustion gases from the first heat exchanger and operative to cool the combustion gases to a compressor inlet temperature.

2. The system of claim 1, wherein the second heat exchanger comprises a steam generator, a feed water heater, or a space air heater.

3. The system of claim 1, wherein the combustor comprises a multi-annular swirl burner.

4. The system of claim 3, wherein the multi-annular swirl burner comprises a fuel-rich zone, a quench zone, and a fuel-lean zone, input annuli in the quench zone having an oppositely directed swirl from input annuli in the fuel-rich zone and in the fuel-lean zone, whereby mixing in the quench zone is increased.

5. The system of claim 1, wherein the turbine is operative to generate 1–4 MW of power.

6. The system of claim 1 further comprising piping from an outlet of the compressor to the combustor to recirculate flue gas to the combustor.

7. The system of claim 1, wherein the working fluid includes air, oxygen, or a combination of air and oxygen, and further includes combustion products.

8. The system of claim 1, further comprising a fuel source in communication with the combustor, the fuel source comprising natural gas, oil fuel, or syngas.

9. The system of claim 1, further comprising a syngas fuel source in communication with the combustor, including a gasifier.

10. A process for generating power, comprising:
    heating a working fluid at ambient pressure to a combustor inlet temperature;
    burning a gaseous, liquid, or solid fuel in a combustor in the presence of the heated working fluid at ambient pressure;
    expanding combustion products from the combustor in a turbine;
    cooling the combustion products from the turbine by heat exchange with the working fluid;
    further cooling the combustion products to a compressor inlet temperature;
    compressing the combustion products to return to ambient pressure.

11. The process of claim 10, further comprising providing air, oxygen, or a combination of air and oxygen as the working fluid.

12. The process of claim 10, further comprising providing natural gas, oil fuel, or syngas as the fuel.

13. The process of claim 10, wherein in the expanding step, the turbine generates 1–4 MW of power.

\* \* \* \* \*

UNITED STATES PATENT AND TRADEMARK OFFICE
CERTIFICATE OF CORRECTION

PATENT NO. : 6,298,654 B1
DATED : October 9, 2001
INVENTOR(S) : Géza Vermes et al.

It is certified that error appears in the above-identified patent and that said Letters Patent is hereby corrected as shown below:

Column 6,
Line 20, delete the following two paragraphs:

"Due to the slightly higher pressure of the flue gas compared to that of the preheated air entering the combustor the two fluids can be conveniently mixed through the entrainment of the air by flue gas jet(s). Alternatively, the MASB design permits the admission of the recirculated flue gas through one of the annuli at some radial distance from the fuel jet to reduce any detrimental effect on flame stability.

The combination of flue gas recirculation (FGR) with the enrichment of the oxygen content in the $O_2/N_2/CO_2$ oxidizing mixture or even using an $O_2/CO_2$ oxidizer, opens new vistas to the APG. In addition to the enhanced cycle efficiency and extremely low $NO_x$ level explained above, the enrichment of the $O_2$ content has the side effect of an increased $CO_2$ concentration in the exhaust. It was recently shown that increased $CO_2$ content improves the economics of $CO_2$ sequestration, which, in turn, mitigates global warming. See "Enriched Oxygen Fired Combustion," Kelly V. Thambimuthu and Eric Croiset, Report, National resources Canada, 1 Haanel Dr., Nepean, Ontario K1A 1M1, Canada."

Column 7,
After line 3, insert the following two paragraphs:

-- Due to the slightly higher pressure of the flue gas compared to that of the preheated air entering the combustor the two fluids can be conveniently mixed through the entrainment of the air by flue gas jet(s). Alternatively, the MASB design permits the admission of the recirculated flue gas through one of the annuli at some radial distance from the fuel jet to reduce any detrimental effect on flame stability.

UNITED STATES PATENT AND TRADEMARK OFFICE
CERTIFICATE OF CORRECTION

PATENT NO.    : 6,298,654 B1
DATED         : October 9, 2001
INVENTOR(S)   : Géza Vermes et al.

It is certified that error appears in the above-identified patent and that said Letters Patent is hereby corrected as shown below:

Column 7, cont'd.
 The combination of flue gas recirculation (FGR) with the enrichment of the oxygen content in the $O_2/N_2/CO_2$ oxidizing mixture or even using an $O_2/CO_2$ oxidizer, opens new vistas to the APG. In addition to the enhanced cycle efficiency and extremely low $NO_x$ level explained above, the enrichment of the $O_2$ content has the side effect of an increased $CO_2$ concentration in the exhaust. It was recently shown that increased $CO_2$ content improves the economics of $CO_2$ sequestration, which, in turn, mitigates global warming. See "Enriched Oxygen Fired Combustion," Kelly V. Thambimuthu and Eric Croiset, Report, National resources Canada, 1 Haanel Dr., Nepean, Ontario K1A 1M1, Canada. --

Signed and Sealed this

Twelfth Day of November, 2002

Attest:

Attesting Officer

JAMES E. ROGAN
*Director of the United States Patent and Trademark Office*